US008506391B2

(12) United States Patent
Jaffe et al.

(10) Patent No.: US 8,506,391 B2

(45) Date of Patent: Aug. 13, 2013

(54) WAGERING GAME WITH MULTI-LEVEL PROGRESSIVE JACKPOT WITH PARTIAL RESET

(75) Inventors: Joel R. Jaffe, Glenview, IL (US); Michael W. Mastropietro, Chicago, IL (US)

(73) Assignee: WMS Gaming Inc., Waukegan, IL (US)

(*) Notice: Subject to any disclaimer, the term of this patent is extended or adjusted under 35 U.S.C. 154(b) by 174 days.

(21) Appl. No.: 12/905,580

(22) Filed: Oct. 15, 2010

(65) Prior Publication Data

US 2011/0092277 A1 Apr. 21, 2011

Related U.S. Application Data

(60) Provisional application No. 61/251,992, filed on Oct. 15, 2009.

(51) Int. Cl.
*G06F 17/00* (2006.01)

(52) U.S. Cl.
USPC .................................. 463/27; 463/26; 463/28

(58) Field of Classification Search
USPC .................................. 463/20, 25–28, 16–17
See application file for complete search history.

(56) References Cited

U.S. PATENT DOCUMENTS

| | | | | |
|---|---|---|---|---|
| 4,624,459 | A | 11/1986 | Kaufman | 273/143 R |
| 4,837,728 | A * | 6/1989 | Barrie et al. | 463/27 |
| 4,861,041 | A * | 8/1989 | Jones et al. | 273/292 |
| 4,948,134 | A * | 8/1990 | Suttle et al. | 463/13 |
| 5,116,055 | A | 5/1992 | Tracy | 273/138 A |
| 5,249,800 | A | 10/1993 | Hilgendorf et al. | 273/138 A |
| 5,275,400 | A | 1/1994 | Weingardt et al. | 463/12 |
| 5,280,909 | A | 1/1994 | Tracy | 273/138 A |
| 5,344,144 | A | 9/1994 | Canon | 273/138 A |
| 5,377,973 | A | 1/1995 | Jones et al. | 273/85 C P |
| 5,393,057 | A | 2/1995 | Marnell, II | 273/85 CP |
| 5,417,430 | A | 5/1995 | Breeding | 273/292 |

(Continued)

FOREIGN PATENT DOCUMENTS

| | | |
|---|---|---|
| CA | 2 334 546 | 8/2001 |
| DE | 195 15 983 A1 | 11/1996 |

(Continued)

OTHER PUBLICATIONS

Article for “Easy Riches” by Sigma Game, Strictly Slots, 1 page (Aug. 2001).

(Continued)

*Primary Examiner* — Dmitry Suhol
*Assistant Examiner* — Jason Yen
(74) *Attorney, Agent, or Firm* — Nixon Peabody LLP

(57) ABSTRACT

A gaming system and method for conducting a wagering game includes a bonus feature that awards percentages of a progressive jackpot award without resetting the progressive jackpot award. A wager input receives a wager from a player to play a single play of a wagering game. The wagering increases the progressive jackpot award. A bonus feature is triggered that includes awarding a first award that has an amount that is a percentage less than 100% of the progressive jackpot award. The bonus feature may also award a second award that is at least the entire progressive jackpot award. If the first award is awarded, the progressive jackpot award remains at the same level. If the second award is awarded, the progressive jackpot award is reset to a predetermined minimum value.

16 Claims, 7 Drawing Sheets

(56) References Cited

U.S. PATENT DOCUMENTS

| | | | | |
|---|---|---|---|---|
| 5,524,888 | A | 6/1996 | Heidel | 463/22 |
| 5,544,892 | A | 8/1996 | Breeding | 273/292 |
| 5,564,700 | A | 10/1996 | Celona | 463/27 |
| 5,577,959 | A | 11/1996 | Takemoto et al. | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | 463/20 |
| 5,645,486 | A | 7/1997 | Nagao et al. | 463/27 |
| 5,647,592 | A | 7/1997 | Gerow | 463/139 |
| 5,655,961 | A | 8/1997 | Acres et al. | 463/27 |
| 5,766,076 | A | 6/1998 | Pease et al. | 463/27 |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,839,956 | A | 11/1998 | Takemoto | 463/25 |
| 5,848,932 | A | 12/1998 | Adams | 463/20 |
| 5,851,147 | A | 12/1998 | Stupak | 463/13 |
| 5,855,515 | A | 1/1999 | Pease et al. | 463/27 |
| 5,876,284 | A | 3/1999 | Acres et al. | 463/25 |
| 5,885,158 | A | 3/1999 | Torango et al. | 463/27 |
| 5,941,773 | A | 8/1999 | Harlick | 463/26 |
| 5,944,606 | A | 8/1999 | Gerow | 463/27 |
| 5,951,011 | A * | 9/1999 | Potter et al. | 273/292 |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/16 |
| 6,032,955 | A | 3/2000 | Luciano et al. | 273/138.1 |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | 463/27 |
| 6,102,474 | A | 8/2000 | Daley | 296/836 |
| 6,102,799 | A | 8/2000 | Stupak | 463/27 |
| 6,110,043 | A | 8/2000 | Olsen | 463/27 |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorasch et al. | 273/138.1 |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | 463/16 |
| 6,210,277 | B1 | 4/2001 | Stefan | 463/27 |
| 6,217,448 | B1 | 4/2001 | Olsen | 463/25 |
| 6,220,593 | B1 | 4/2001 | Pierce et al. | 273/138.1 |
| 6,224,482 | B1 | 5/2001 | Bennett | 463/20 |
| 6,224,484 | B1 | 5/2001 | Okuda et al. | 463/27 |
| 6,231,445 | B1 | 5/2001 | Acres | 463/42 |
| 6,241,608 | B1 | 6/2001 | Torango | 463/27 |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | 463/27 |
| 6,345,824 | B1 | 2/2002 | Selitzky | 273/292 |
| 6,347,996 | B1 | 2/2002 | Gilmore et al. | 463/17 |
| 6,358,149 | B1 | 3/2002 | Schneider et al. | 463/27 |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | 463/27 |
| 6,431,983 | B2 | 8/2002 | Acres | 463/25 |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | 463/25 |
| 6,592,458 | B1 | 7/2003 | Ho | 463/17 |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | 463/19 |
| 6,599,193 | B2 | 7/2003 | Baerlocher et al. | 463/27 |
| 6,601,771 | B2 | 8/2003 | Charrin | 235/492 |
| 6,648,762 | B2 | 11/2003 | Walker et al. | 463/25 |
| 6,656,052 | B2 | 12/2003 | Abramopoulos et al. | 463/47 |
| 6,676,513 | B2 | 1/2004 | Gauselmann | 463/20 |
| 6,702,674 | B1 * | 3/2004 | De Bruin et al. | 463/26 |
| 6,712,695 | B2 | 3/2004 | Mothwurf et al. | 463/25 |
| 6,733,390 | B2 | 5/2004 | Walker et al. | 463/23 |
| 6,776,715 | B2 | 8/2004 | Price | 463/27 |
| 6,887,154 | B1 | 5/2005 | Luciano, Jr. et al. | 463/26 |
| 7,004,466 | B2 | 2/2006 | Gauselmann | 463/138 |
| 7,036,012 | B2 | 4/2006 | Charrin | 713/169 |
| 7,056,215 | B1 | 6/2006 | Olive | 463/27 |
| 7,481,430 | B1 | 1/2009 | Jackson et al. | 273/138.1 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | 463/20 |
| 2003/0036430 | A1 | 2/2003 | Cannon | 463/42 |
| 2003/0045337 | A1 | 3/2003 | Byrne | 463/16 |
| 2003/0045351 | A1 | 3/2003 | Gauselmann | 463/29 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0109306 | A1 | 6/2003 | Karmarkar | 463/40 |
| 2003/0148807 | A1 * | 8/2003 | Acres | 463/26 |
| 2003/0148808 | A1 | 8/2003 | Price | 463/27 |
| 2003/0181231 | A1 | 9/2003 | Vancura et al. | 463/9 |
| 2003/0186733 | A1 | 10/2003 | Wolf et al. | 463/16 |
| 2003/0211884 | A1 | 11/2003 | Gauselmann | 463/20 |
| 2003/0216166 | A1 | 11/2003 | Baerlocher et al. | 463/20 |
| 2003/0222402 | A1 | 12/2003 | Olive | 273/292 |
| 2003/0228899 | A1 * | 12/2003 | Evans | 463/25 |
| 2003/0236116 | A1 | 12/2003 | Marks et al. | 463/16 |
| 2004/0009808 | A1 | 1/2004 | Gauselmann | 463/25 |
| 2004/0009811 | A1 | 1/2004 | Torango | 463/25 |
| 2004/0023716 | A1 | 2/2004 | Gauselmann | 463/23 |
| 2004/0038741 | A1 | 2/2004 | Gauselmann | 463/42 |
| 2004/0048644 | A1 | 3/2004 | Gerrard et al. | 463/16 |
| 2004/0092304 | A1 | 5/2004 | George | 463/29 |
| 2005/0003880 | A1 | 1/2005 | Engleman | 463/16 |
| 2005/0055113 | A1 | 3/2005 | Gauselmann | 700/91 |
| 2005/0059467 | A1 * | 3/2005 | Saffari et al. | 463/19 |
| 2005/0059472 | A1 | 3/2005 | Joshi et al. | 463/20 |
| 2005/0059481 | A1 * | 3/2005 | Joshi et al. | 463/27 |
| 2005/0064930 | A1 * | 3/2005 | Jubinville et al. | 463/17 |
| 2005/0096130 | A1 | 5/2005 | Mullins | 463/27 |
| 2005/0137010 | A1 | 6/2005 | Enzminger et al. | 463/25 |
| 2005/0192088 | A1 | 9/2005 | Hartman et al. | 463/27 |
| 2005/0215313 | A1 | 9/2005 | O'Halloran | 463/26 |
| 2005/0239542 | A1 * | 10/2005 | Olsen | 463/27 |
| 2006/0003829 | A1 | 1/2006 | Thomas | 463/20 |
| 2006/0019737 | A1 | 1/2006 | Yang | 463/19 |
| 2006/0025195 | A1 * | 2/2006 | Pennington et al. | 463/16 |
| 2006/0025210 | A1 | 2/2006 | Johnson | 463/25 |
| 2006/0030403 | A1 | 2/2006 | Lafky et al. | 463/27 |
| 2006/0035706 | A1 * | 2/2006 | Thomas et al. | 463/27 |
| 2006/0052159 | A1 | 3/2006 | Cahill et al. | 463/27 |
| 2006/0052160 | A1 * | 3/2006 | Saffari et al. | 463/27 |
| 2006/0073887 | A1 | 4/2006 | Nguyen et al. | 463/20 |
| 2006/0073889 | A1 | 4/2006 | Edidin et al. | 463/27 |
| 2006/0116201 | A1 | 6/2006 | Gauselmann | 463/26 |
| 2006/0135254 | A1 * | 6/2006 | Thomas | 463/25 |
| 2006/0142079 | A1 | 6/2006 | Ikehara et al. | 463/27 |
| 2006/0142086 | A1 | 6/2006 | Blackburn et al. | 463/42 |
| 2006/0154718 | A1 | 7/2006 | Willyard et al. | 463/25 |
| 2006/0178203 | A1 | 8/2006 | Hughes et al. | 463/20 |
| 2006/0183535 | A1 | 8/2006 | Marks et al. | 463/20 |
| 2006/0183537 | A1 | 8/2006 | Dickerson | 463/27 |
| 2006/0183538 | A1 | 8/2006 | Michaelson et al. | 463/27 |

| | | | | |
|---|---|---|---|---|
| 2006/0189380 | A1 | 8/2006 | Schultz et al. | 463/20 |
| 2006/0281527 | A1 | 12/2006 | Dunaevsky et al. | 463/20 |
| 2006/0287077 | A1 | 12/2006 | Grav et al. | 463/27 |
| 2007/0026941 | A1 | 2/2007 | Block et al. | 463/29 |
| 2007/0054733 | A1* | 3/2007 | Baerlocher | 463/27 |
| 2007/0060244 | A1 | 3/2007 | Yaldoo et al. | 463/16 |
| 2007/0060271 | A1 | 3/2007 | Cregan et al. | 463/16 |
| 2007/0060314 | A1 | 3/2007 | Baerlocher et al. | 463/25 |
| 2007/0060319 | A1 | 3/2007 | Block et al. | 463/27 |
| 2007/0060365 | A1 | 3/2007 | Tien et al. | 463/42 |
| 2007/0218975 | A1* | 9/2007 | Iddings et al. | 463/25 |
| 2008/0153587 | A1* | 6/2008 | Yoshimura | 463/27 |
| 2009/0104986 | A1* | 4/2009 | Englman et al. | 463/27 |
| 2009/0117972 | A1* | 5/2009 | Cava | 463/20 |
| 2009/0124363 | A1* | 5/2009 | Baerlocher et al. | 463/27 |
| 2009/0131149 | A1 | 5/2009 | Jackson et al. | 463/20 |
| 2009/0143127 | A1* | 6/2009 | Frick et al. | 463/17 |
| 2009/0291732 | A1* | 11/2009 | Lutnick et al. | 463/16 |
| 2009/0298574 | A1 | 12/2009 | Gauselmann | 463/20 |
| 2009/0305777 | A1* | 12/2009 | Anderson | 463/27 |
| 2010/0016062 | A1* | 1/2010 | Baerlocher | 463/20 |
| 2010/0087246 | A1* | 4/2010 | Ward | 463/27 |
| 2010/0304830 | A1 | 12/2010 | Englman et al. | 463/17 |
| 2011/0003628 | A1* | 1/2011 | Marino | 463/20 |
| 2011/0003637 | A1* | 1/2011 | LeFever | 463/27 |
| 2011/0223992 | A1* | 9/2011 | Vaughan | 463/27 |

FOREIGN PATENT DOCUMENTS

| | | | |
|---|---|---|---|
| DE | 196 24 321 | A1 | 1/1998 |
| EP | 0 521 599 | A1 | 1/1993 |
| GB | 2 153 572 | A | 8/1985 |
| GB | 2 181 589 | A | 4/1987 |
| GB | 2 242 300 | A | 9/1991 |
| GB | 2 313 792 | A | 10/1997 |
| GB | 2 333 880 | A | 8/1999 |
| WO | WO 99/03078 | A1 | 1/1999 |
| WO | WO 99/19037 | A1 | 4/1999 |
| WO | WO 01/33478 | A1 | 5/2001 |
| WO | WO 03/026754 | A1 | 4/2003 |
| WO | WO 03/083789 | A1 | 10/2003 |

OTHER PUBLICATIONS

Article for “Millioniser” by Glenn Haussman, Strictly Slots, pp. 50-53 (Mar. 2004).

Product Sheet for “Big Games Safari,” IGT, 24 pages (2000).

“New ’97 Games,” International Gaming & Wagering Business, 24 pages (Mar. 1997).

International Search Report—PCT/US06/20979 dated Nov. 13, 2006 (2 pages).

Written Opinion corresponding to International Patent Application Serial No. PCT/US2006/020979, United States Patent Office; dated Jan. 29, 2007; 3 pages.

International Preliminary Report on Patentability corresponding to International Patent Application Serial No. PCT/US2006/020979, United States Patent Office; dated Mar. 10, 2008; 5 pages.

* cited by examiner

WAGERING GAME WITH MULTI-LEVEL PROGRESSIVE JACKPOT WITH PARTIAL RESET

RELATED APPLICATIONS

This application claims priority from U.S. Provisional Application No. 61/251,992, filed Oct. 15, 2009 and that application is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus and methods for playing wagering games, and more particularly to a progressive bonus feature that includes multiple awards at different percentages of a progressive jackpot award amount that are awarded without resetting the progressive jackpot award amount.

BACKGROUND OF THE INVENTION

Gaming terminals, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

In order to attract players and achieve player loyalty to different games, game designers seek to make games interesting to the player. There are therefore continual challenges to develop different attractive features to a player in wagering games.

One concept that has been successfully employed to enhance the entertainment value of a game is that of a "secondary" or "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" game involves collecting coin-in data from participating gaming device(s) (e.g., slot machines), contributing a percentage of that coin-in data to a jackpot amount, and awarding that jackpot amount to a player upon the occurrence of a certain jackpot-won event. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement. In existing progressive jackpots, once the progressive jackpot is awarded, the jackpot amount is reset to the predetermined minimum amount. This predetermined minimum amount is not as attractive to players as it is not as exciting as the levels that a progressive jackpot can achieve after a certain amount of time. This may result in some players not being attracted to the game in the early stages of the accumulation of the progressive jackpot.

SUMMARY

One example disclosed is a gaming system including a wager input for receiving a wager from a player to play a wagering game. At least one display displays a randomly selected outcome of the wagering game. At least one controller is operative to contribute at least a portion of the wager to a progressive jackpot award. The controller also conducts a feature including awarding a first award without resetting the progressive jackpot award, the first award being less than 100% of the progressive jackpot award or awarding at least the entire progressive jackpot award and resetting the progressive jackpot award to a predetermined minimum value.

Another example disclosed is a method of conducting a wagering game on a gaming system. A player input indicative of a wager to play the wagering game is accepted at a user interface device. At least a portion of the wager is contributed to a progressive jackpot award. A randomly generated outcome of the wagering game is displayed on a display device. In response to a triggering event, at least one gaming apparatus controller conducts a bonus feature including awarding a first award that is less than 100% of the progressive jackpot award and keeping the progressive jackpot award at the same level. The bonus feature may also award a second award that is at least the entire progressive jackpot award and resetting the progressive jackpot award to a predetermined minimum value.

Another example is a method of conducting a wagering game on a gaming system. A player input at a user interface device indicative of a wager to play the wagering game is accepted. At least a portion of the wager is contributed to a jackpot award. At least one controller is used to conduct a feature including awarding one of a plurality of awards without resetting the progressive jackpot award, each of the plurality of awards being less than 100% of the progressive jackpot award or awarding at least the entire progressive jackpot award and resetting the progressive jackpot award to a predetermined minimum value.

Another example disclosed is a machine readable medium having stored thereon instructions for award different percentage amounts of a progressive award jackpot. The machine readable medium includes machine executable code which when executed by at least one machine, causes the machine to receive a wager from a player to play a wagering game. The code causes the machine to display a randomly selected outcome of the wagering game. The code causes the machine to contribute at least a portion of the wager to a progressive jackpot award. The code causes the machine to conduct a feature including awarding a first award without resetting the progressive jackpot award, the first award being less than 100% of the progressive jackpot award or awarding at least the entire progressive jackpot award and resetting the progressive jackpot award to a predetermined minimum value.

Another example is a progressing gaming method that includes displaying a progressive jackpot award on a display device. At least one controller is used to increment the progressive jackpot award in response to play of wagering games at one or more gaming devices. In response to a triggering event, at least one controller is used to award less than 100% of the progressive jackpot award without resetting the progressive jackpot award to a reset value, or award at least the entire progressive jackpot award and resetting the progressive jackpot award to the reset value.

Additional aspects of the invention will be apparent to those of ordinary skill in the art in view of the detailed description of various embodiments, which is made with reference to the drawings, a brief description of which is provided below.

Figure 1:
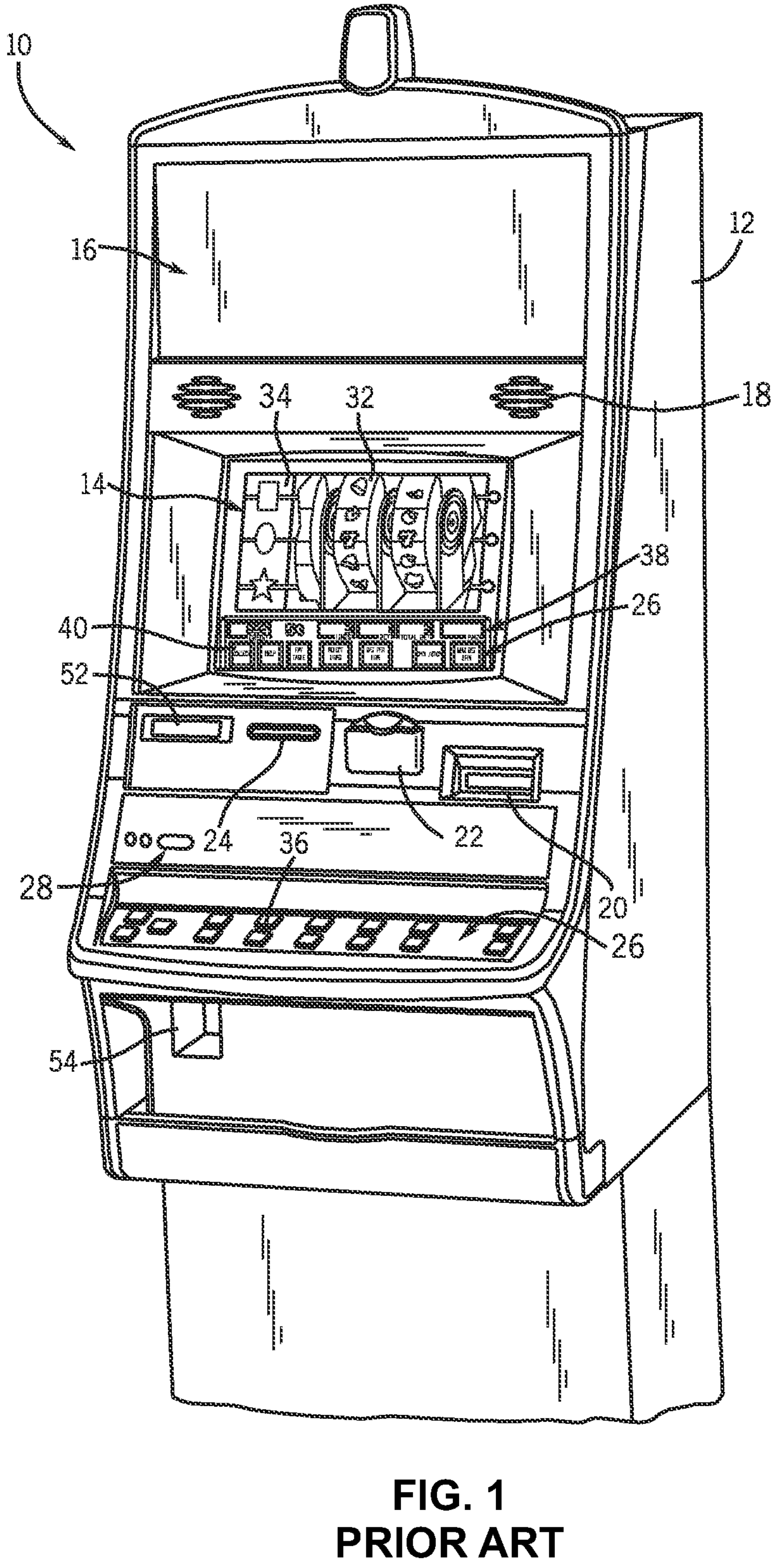
FIG. 1 PRIOR ART
FIG. 1 is a perspective view of a free-standing gaming terminal.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, the gaming terminal 10 may be an electromechanical gaming terminal configured to play mechanical slots, or it may be an electronic gaming terminal configured to play a video casino game, such as slots, keno, poker, blackjack, roulette, craps, etc. It should be understood that although the gaming terminal 10 is shown as a free-standing terminal of the upright type, it may take on a wide variety of other forms such as a free-standing terminal of the slant-top type, a portable or handheld device primarily used for gaming, a mobile telecommunications device such as a mobile telephone or personal digital assistant (PDA), a counter-top or bar-top gaming terminal, or other personal electronic device such as a portable television, MP3 player, entertainment device, etc.

The illustrated gaming terminal 10 comprises a cabinet or housing 12. For output devices, the gaming terminal 10 may include a primary display area 14, a secondary display area 16, and one or more audio speakers 18. The primary display area 14 and/or secondary display area 16 may display information associated with wagering games, non-wagering games, community games, progressives, advertisements, services, premium entertainment, text messaging, e-mails, alerts or announcements, broadcast information, subscription information, etc. For input devices, the gaming terminal 10 may include a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements may exist and may be used in any number of combinations to create various forms of a gaming terminal.

The primary display area 14 may include a mechanical-reel display, a video display, or a combination thereof in which a transmissive video display in front of the mechanical-reel display portrays a video image superimposed over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display may be a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10. The primary display area 14 may include one or more paylines 30 (see FIG. 3) extending along a portion thereof. In the illustrated embodiment, the primary display area 14 comprises a plurality of mechanical reels 32 and a video display 34 such as a transmissive display (or a reflected image arrangement in other embodiments) in front of the mechanical reels 32. If the wagering game conducted via the gaming terminal 10 relies upon the video display 34 only and not the mechanical reels 32, the mechanical reels 32 may be removed from the interior of the terminal and the video display 34 may be of a non-transmissive type. Similarly, if the wagering game conducted via the gaming terminal 10 relies upon the mechanical reels 32 but not the video display 34, the video display 34 may be replaced with a conventional glass panel. Further, the underlying mechanical-reel display may be replaced with a video display such that the primary display area 14 includes layered video displays, or may be replaced with another mechanical or physical member such as a mechanical wheel (e.g., a roulette game), dice, a pachinko board, or a diorama presenting a three-dimensional model of a game environment.

Video images in the primary display area 14 and/or the secondary display area 16 may be rendered in two-dimensional (e.g., using Flash Macromedia™) or three-dimensional graphics (e.g., using Renderware™). The images may be played back (e.g., from a recording stored on the gaming terminal 10), streamed (e.g., from a gaming network), or received as a TV signal (e.g., either broadcast or via cable). The images may be animated or they may be real-life images, either prerecorded (e.g., in the case of marketing/promotional material) or as live footage, and the format of the video images may be an analog format, a standard digital format, or a high-definition (HD) digital format.

The player-input devices 26 may include a plurality of buttons 36 on a button panel and/or a touch screen 38 mounted over the primary display area 14 and/or the secondary display area 16 and having one or more soft touch keys 40. The player-input devices 26 may further comprise technologies that do not rely upon touching the gaming terminal, such as speech-recognition technology, gesture-sensing technology, eye-tracking technology, etc.

The information reader 24 is preferably located on the front of the housing 12 and may take on many forms such as a ticket reader, card reader, bar code scanner, wireless transceiver (e.g., RFID, Bluetooth, etc.), biometric reader, or computer-readable-storage-medium interface. Information may be transmitted between a portable medium (e.g., ticket, voucher, coupon, casino card, smart card, debit card, credit card, etc.) and the information reader 24 for accessing an account associated with cashless gaming, player tracking, game customization, saved-game state, data transfer, and casino services as more fully disclosed in U.S. Patent Publication No. 2003/0045354 entitled "Portable Data Unit for Communicating With Gaming Machine Over Wireless Link," which is incorporated herein by reference in its entirety. The account may be stored at an external system 46 (see FIG. 2) as more fully disclosed in U.S. Pat. No. 6,280,328 to Holch et al. entitled "Cashless Computerized Video Game System and Method," which is incorporated herein by referenced in its entirety, or directly on the portable medium. To enhance security, the individual carrying the portable medium may be required to enter a secondary independent authenticator (e.g., password, PIN number, biometric, etc.) to access their account.

Figure 2:
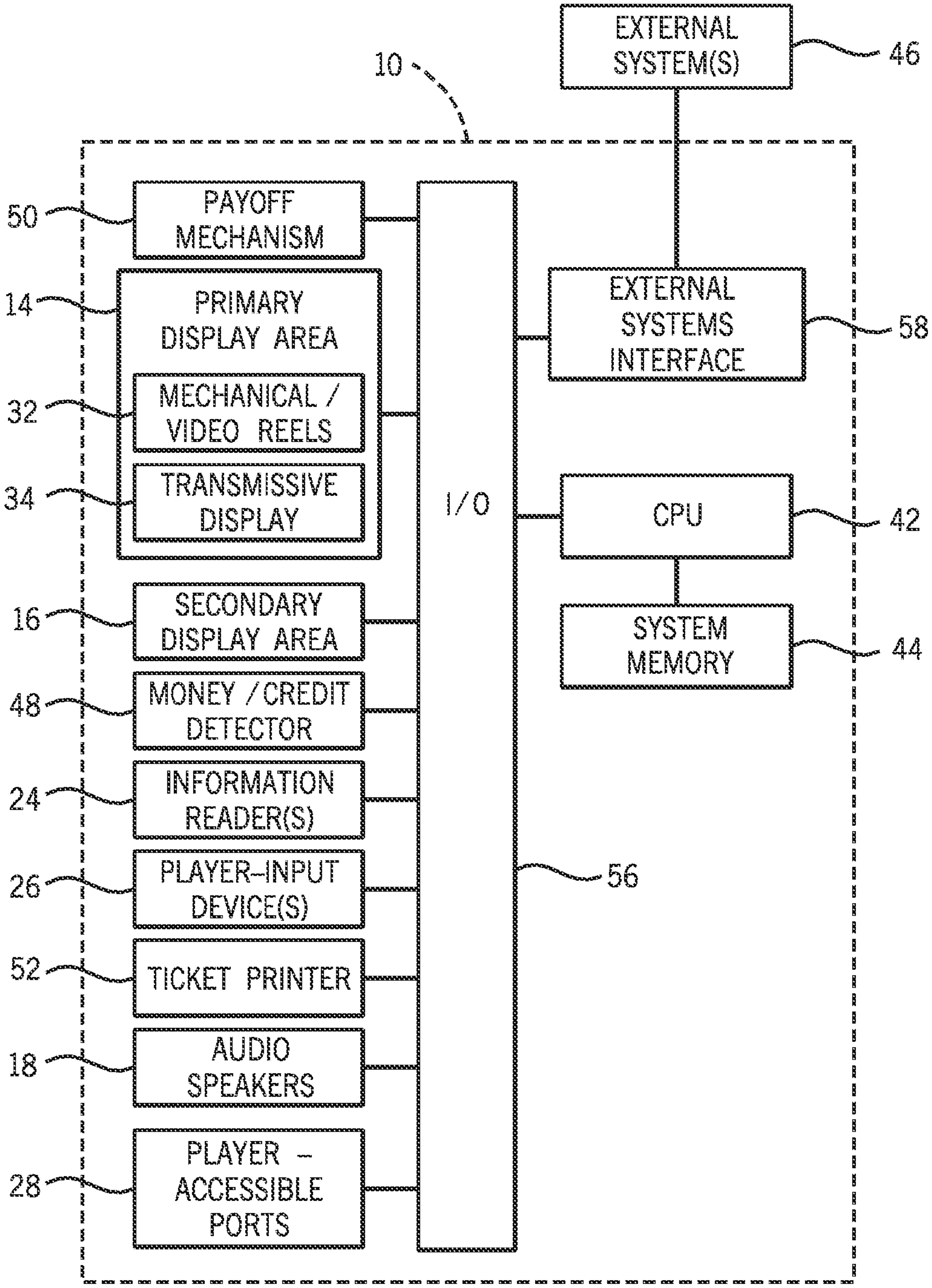
FIG. 2 PRIOR ART
FIG. 2 is a schematic view of a gaming system.

Turning now to FIG. 2, the various components of the gaming terminal 10 are controlled by a central processing unit (CPU) 42, also referred to herein as a controller or processor (such as a microcontroller or microprocessor). The CPU 42 can include any suitable processor, such as an Intel® Pentium processor, Intel® Core 2 Duo processor, AMD Opteron™ processor, or UltraSPARC® processor. To provide gaming functions, the controller 42 executes one or more game programs stored in one or more computer readable storage media in the form of memory 44 or other suitable storage device. The controller 42 uses a random number generator (RNG) to randomly generate a wagering game outcome from a plurality of possible outcomes. Alternatively, the outcome may be centrally determined using either an RNG or pooling scheme at a remote controller included, for example, within the external system 46. It should be appreciated that the controller 42 may include one or more microprocessors, including but not limited to a master processor, a slave processor, and a secondary or parallel processor.

The controller 42 is coupled to the system memory 44 and also to a money/credit detector 48. The system memory 44 may comprise a volatile memory (e.g., a random-access memory (RAM)) and a non-volatile memory (e.g., an EEPROM). The system memory 44 may include multiple RAM and multiple program memories. The money/credit detector 48 signals the processor that money and/or credits have been input via a value-input device, such as the bill validator 20, coin acceptor 22, or via other sources, such as a cashless gaming account, etc. These components may be located internal or external to the housing 12 of the gaming terminal 10 and connected to the remainder of the components of the gaming terminal 10 via a variety of different wired or wireless connection methods. The money/credit detector 48 detects the input of funds into the gaming terminal 10 (e.g., via currency, electronic funds, ticket, card, etc.) that are generally converted into a credit balance available to the player for wagering on the gaming terminal 10. The credit detector 48 detects when a player places a wager (e.g., via a player-input device 26) to play the wagering game, the wager then generally being deducted from the credit balance. The money/credit detector 48 sends a communication to the controller 42 that a wager has been detected and also communicates the amount of the wager.

As seen in FIG. 2, the controller 42 is also connected to, and controls, the primary display area 14, the player-input device 26, and a payoff mechanism 50. The payoff mechanism 50 is operable in response to instructions from the controller 42 to award a payoff to the player in response to certain winning outcomes that might occur in the base game, the bonus game(s), or via an external game or event. The payoff may be provided in the form of money, redeemable points, services, or any combination thereof. Such payoff may be associated with a ticket (from a ticket printer 52), portable data unit (e.g., a card), coins (from a coin outlet 54 shown in FIG. 1), currency bills, accounts, and the like. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+frontside bus and a PCI backside bus. Although the I/O circuit 56 is shown as a single block, it should be appreciated that the I/O circuit 56 may include a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface 58, which is connected to the external system 46. The controller 42 communicates with the external system 46 via the external system interface 58 and a communication path (e.g., serial, parallel, IR, RC, 10bT, etc.). The external system 46 may include a gaming network, other gaming terminals, a gaming server, a remote controller, communications hardware, or a variety of other interfaced systems or components.

Controller 42, as used herein, comprises any combination of hardware, software, and/or firmware that may be disposed or resident inside and/or outside of the gaming terminal 10 and may communicate with and/or control the transfer of data between the gaming terminal 10 and a bus, another computer, processor, or device and/or a service and/or a network. The controller 42 may comprise one or more controllers or processors. In FIG. 2, the controller 42 in the gaming terminal 10 is depicted as comprising a CPU, but the controller 42 may alternatively comprise a CPU in combination with other components, such as the I/O circuit 56 and the system memory 44. The controller 42 is operable to execute all of the various gaming methods and other processes disclosed herein.

The gaming terminal 10 may communicate with external system 46 (in a wired or wireless manner) such that each terminal operates as a "thin client" having relatively less functionality, a "thick client" having relatively more functionality, or with any range of functionality therebetween (e.g., a "rich client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets may be contained within the gaming terminal 10 ("thick client" gaming terminal), the external systems 46 ("thin client" gaming terminal), or distributed therebetween in any suitable manner ("rich client" gaming terminal).

Figure 3:
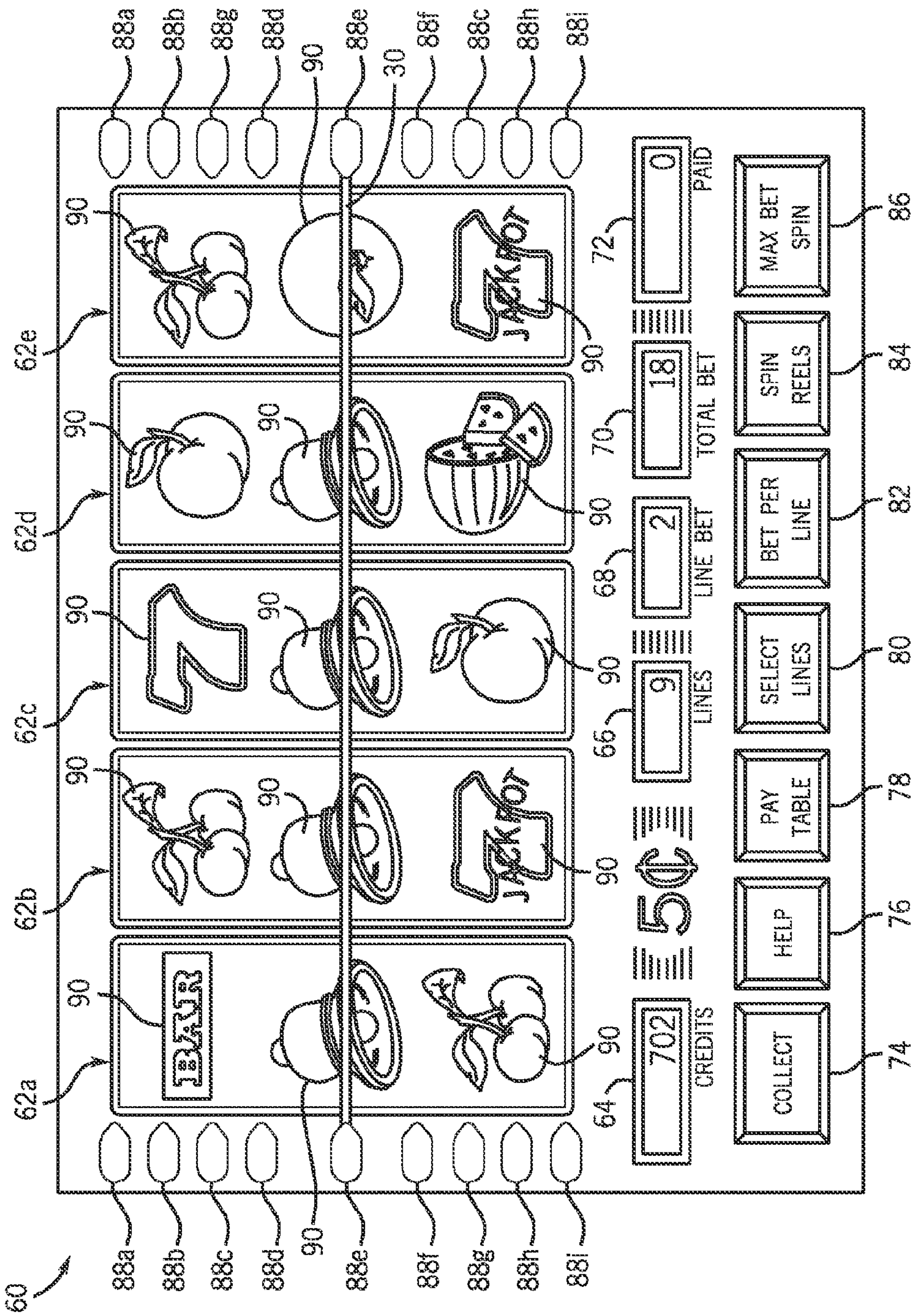
FIG. 3 PRIOR ART
FIG. 3 is an image of a basic-game screen of a wagering game that may be displayed on a gaming terminal.

Referring now to FIG. 3, an image of a basic-game screen 60 adapted to be displayed on the primary display area 14 is illustrated, according to one disclosed example. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

The basic-game screen 60 may be displayed on the primary display area 14 or a portion thereof. In FIG. 3, the basic-game screen 60 portrays a plurality of simulated movable reels 62*a-e*. Alternatively or additionally, the basic-game screen 60 may portray a plurality of mechanical reels. The basic-game screen 60 may also display a plurality of game-session meters and various buttons adapted to be actuated by a player.

In the illustrated embodiment, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The user-selectable buttons may include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager that is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

Paylines 30 may extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations may be evaluated as line pays or scatter pays. Line pays may be evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown, a gaming terminal with any plurality of reels may also be used in accordance with the present invention.

Figure 4:
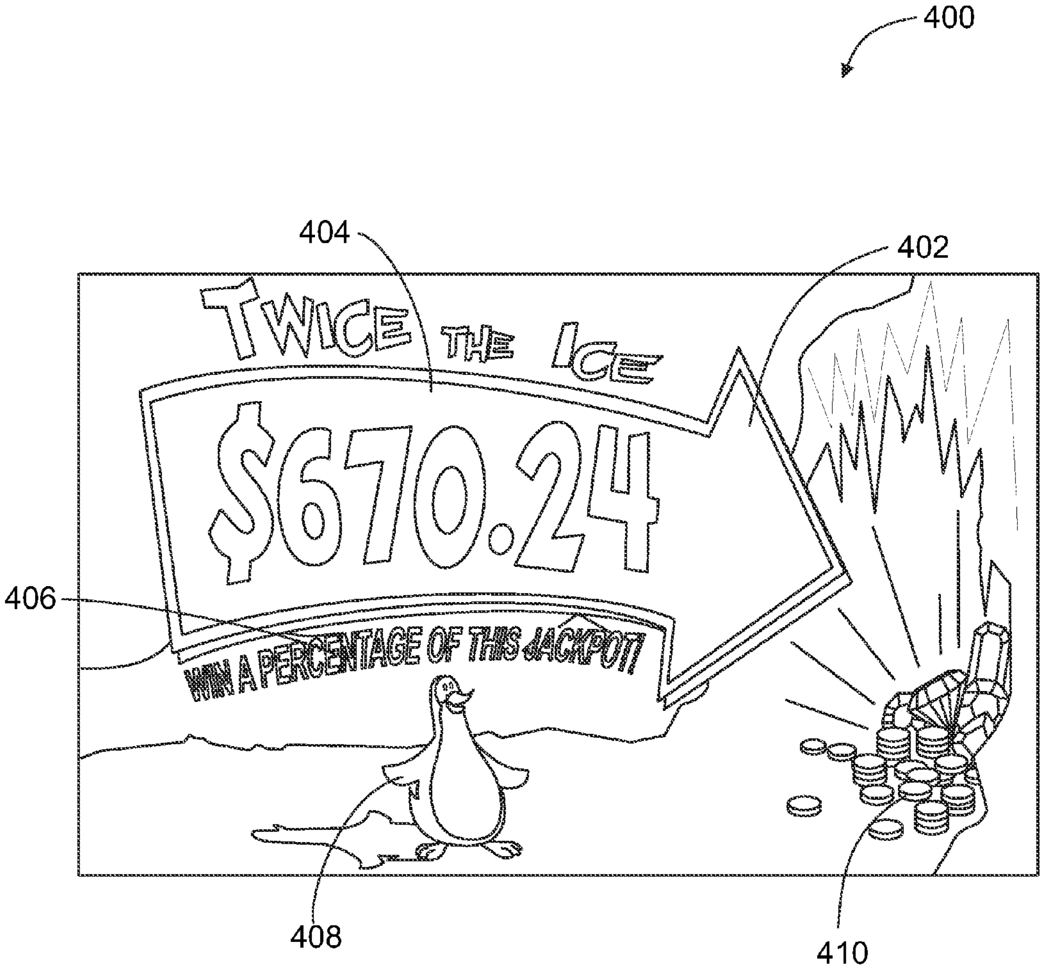
FIG. 4 is an image of an informational screen displayed on a secondary display during regular game play for a bonus feature that includes awards of different percentages of a progressive jackpot award.
Figure 5:
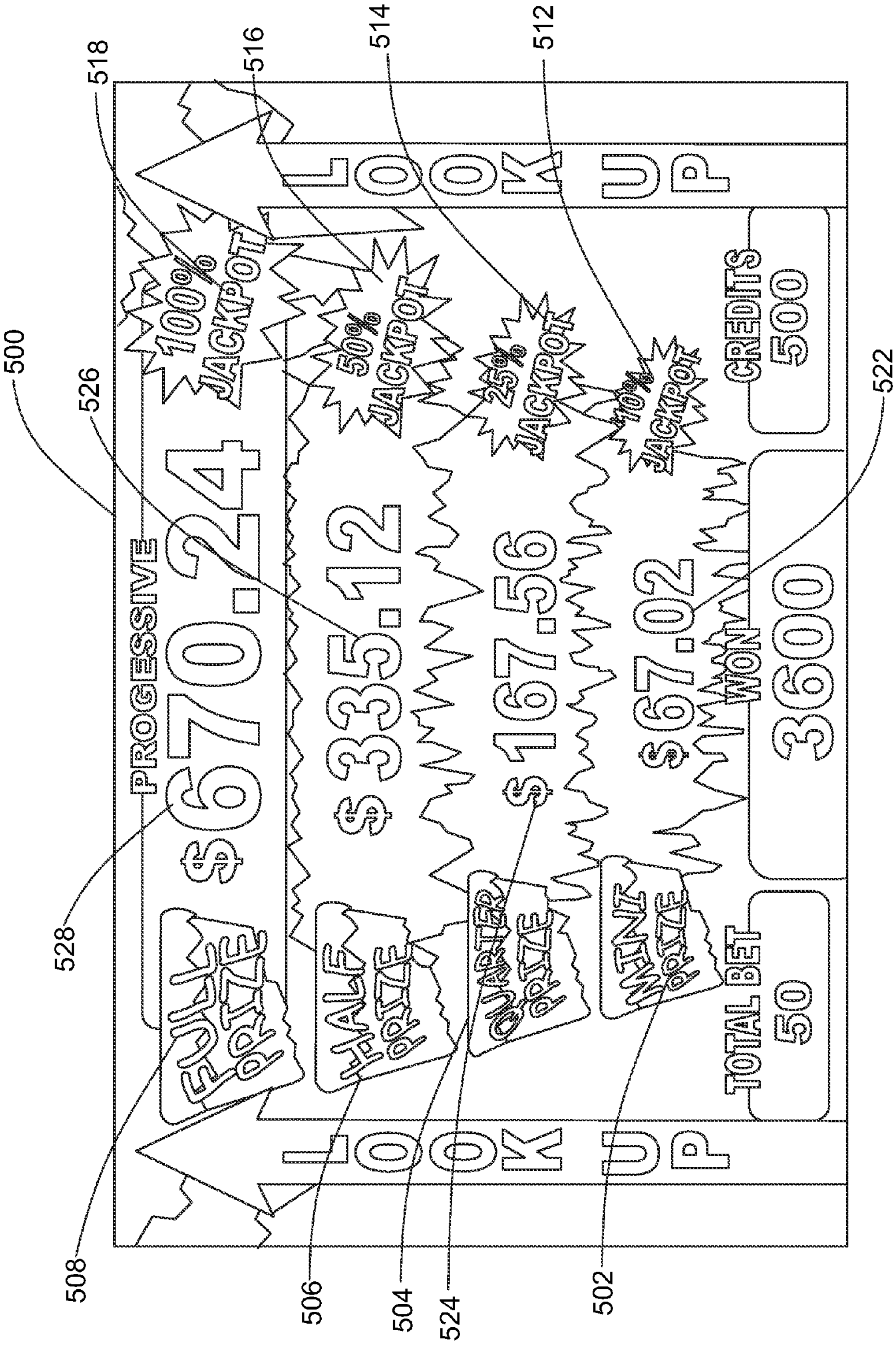
FIG. 5 is an image of a game screen that displays the amounts of different percentage awards of a progressive jackpot award without resetting the progressive jackpot award during the bonus feature.
Figure 6:
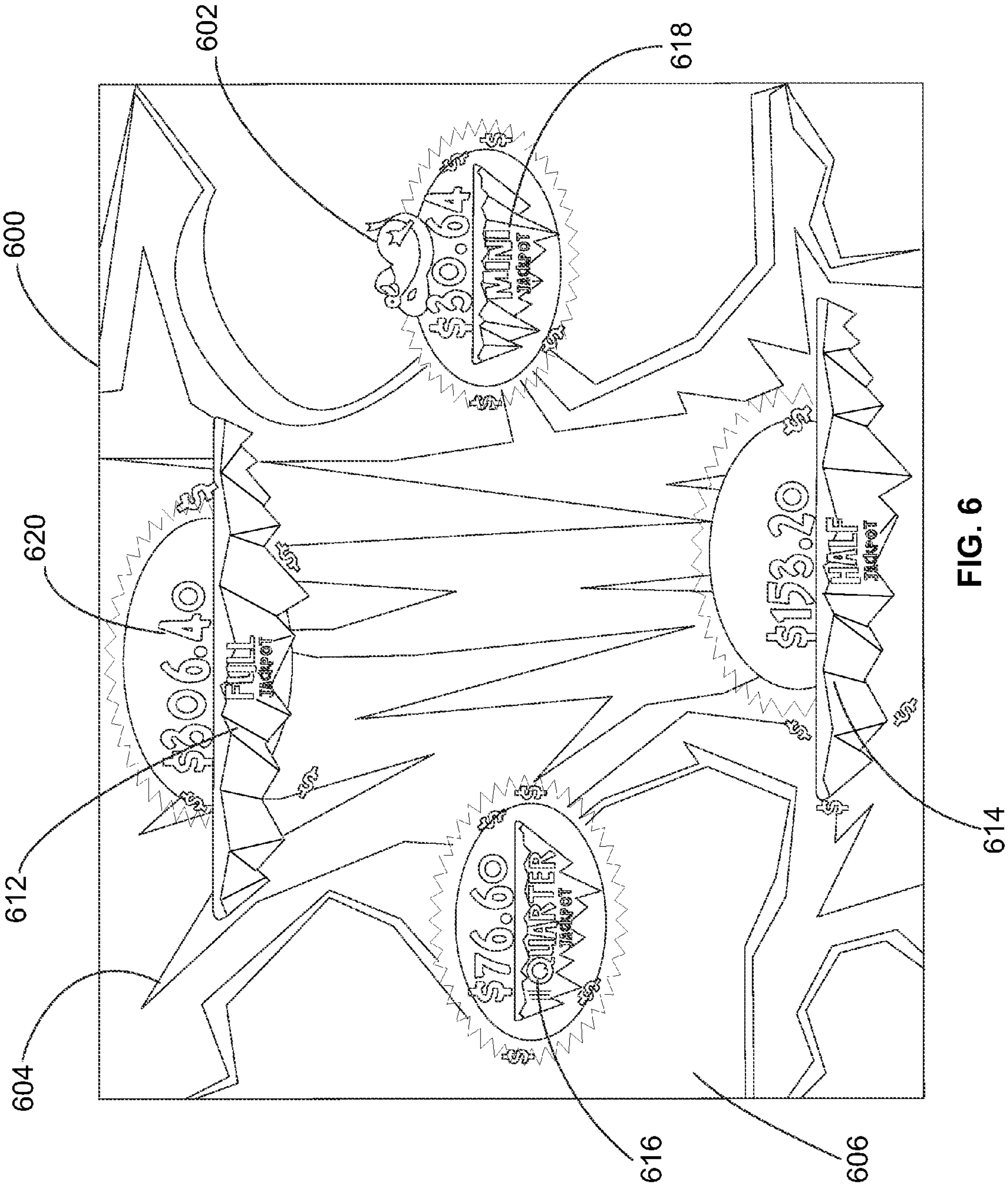
FIG. 6 is an image of a bonus feature game play screen that indicates the award of one of multiple awards at different percentages of a progressive jackpot award.

Turning now to FIGS. 4-6, a progressive jackpot award feature allowing the awarding of awards in the amounts of partial percentages of a progressive jackpot award without resetting the jackpot award amount is shown, according to one disclosed example. The progressive award feature may be provided in relation to a basic-game screen adapted to be displayed on the primary display area 14 in FIG. 1. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements in FIG. 1.

FIG. 4 shows a bonus feature information screen image 400 displayed on the secondary display area 16 to convey information to the player for a progressive jackpot award with different percentage award amounts. The bonus information screen image 400 is displayed during the basic game play of the wagering game and at times when the gaming terminal 10 in FIG. 1 is not being played to attract potential players. The informational screen 400 includes an arrow indicator icon 402 that includes the current value of the progressive jackpot award 404. In this example, the progressive jackpot award 404 is $670.24. The amount of the progressive jackpot award 404 increases with each wager inputs at the gaming terminal 10 and other terminals linked to the award, thus increasing the attractiveness of the award over time. The information screen 400 also may include informational text 406 which, in this example, informs the player that percentages of the entire progressive jackpot award amount may be awarded. The information screen 400 also includes a character icon 408 that is a penguin in this example and a treasure icon 410 to increase the attractiveness of the bonus game. Such icons may be consistent with the theme of the bonus feature and/or basic game.

FIG. 5 shows an information screen 500 that may be displayed on the primary display 14 when the bonus feature is triggered. The bonus feature may, for example, be triggered by an outcome displayed in the basic game (e.g., symbol trigger) or by a random event independent of the outcome in the basic game (e.g., mystery trigger). Alternatively, the bonus feature may be triggered as a result of receiving the wager. The information screen 500 displays the amounts of different percentage awards of the progressive jackpot award the player may be awarded to a player when the bonus outcome is triggered. Certain of the awards having amounts that are percentages of the progressive jackpot award may be awarded without resetting the progressive jackpot award amount. The entire progressive jackpot award may also be awarded which results in resetting the progressive jackpot award amount. The informational screen 500 shows a mini award icon 502, a quarter award icon 504, a half award icon 506, and a full award icon 508. The informational screen 500 also includes percentage award icons such as a 10% award icon 512, a 25% award icon 514, a 50% award icon 516, and a 100% award icon 518. The percentage award icons 512, 514, 516 and 518 correspond to the award icons 502, 504, 506 and 508 respectively. The informational screen 500 also includes a 10% award amount 522, a 25% award amount 524, a 50% award amount 526, and a 100% award amount 528. The amounts correspond to the current amounts that may be won at each percentage award level. The amounts change as the progressive jackpot award amount 528 increases. In this example, the 100% progressive award amount is $670.24 and the other awards are percentages of the 100% progressive award amount, such as $167.58 which is the quarter (25%) award value.

FIG. 6 shows a bonus feature game play screen 600 that is displayed on the secondary display area 16 in FIG. 1 when the bonus feature is triggered. In the example shown in FIG. 6, the bonus feature goes over the gaming terminal 10 in FIG. 1 as a portal feature and is triggered mystery style independent of the outcome of the basic game of the wagering game. Alternatively, the bonus feature may be triggered by a basic game outcome with a proportional modification of the bonus outcomes explained below in proportion to the wager size. The frequency of the bonus outcome in the basic game is also proportional to the wager input by the player. When the bonus feature is triggered in this example, the player views a penguin icon 602 slide around an ice cave 604 eventually landing on an ice shelf 606 as shown in FIG. 6. The ice shelf 606 has various shelves representing awards of different percentages of the progressive jackpot award including a 100% level 612, a 50% level 614, a 25% level 616, and a 10% level 618. The entire progressive jackpot award amount is displayed in a jackpot amount field 620. Of course different numbers of levels at different percentages of the progressive jackpot award may be used. The levels 612, 614, 616 and 618 each award an amount that is a percentage of the main progressive jackpot award amount to the player. Thus, the player may win an amount that is 100%, 50%, 25%, or 10% of the progressive jackpot award amount.

In this example, the progressive jackpot award only resets when the 100% award level is awarded to the player. Alternatively, amounts greater than the progressive jackpot award may be awarded, such as 200% of the progressive jackpot award, that will reset the progressive jackpot award. All other percentage awards less than 100% of the progressive jackpot award are awarded at their percentage value of the total progressive jackpot award without resetting the progressive jackpot award amount. This may be accomplished because the percentage award values are not calculated based on a progressive award pool but instead are treated as a basic game award based on the average value, or "expected value," of the progressive jackpot award.

To calculate the expected value of the progressive jackpot award, the game treats the progressive jackpot award value as a constant value based on its "strike" price.

The "strike" price is the mean average value of the 100% progressive jackpot award at which, according to mathematical probabilities, the 100% progressive jackpot award should be awarded to a player. Once this average is known, the expected value (EV) may be calculated for all the other percentage awards based on their frequency and payout amounts. The total expected value of the progressive jackpot award may then be calculated from the EV of each of the percentage awards.

For example, if the strike price is $1,000.00, this indicates that the 100% progressive jackpot award is $1,000. Paying 25% of the total progressive jackpot award every fifth bonus would be worth $50.00 of EV, which is calculated by multiplying the strike price ($1,000) by the percentage of the progressive jackpot award awarded (25%) times the probability or percentage that the bonus will award this percentage of the progressive jackpot award ($1000*.25*.2).

Table 1 below shows a breakout for all the percentages for a progressive jackpot award with a strike price of $994.00 and an average payout (or EV) of $159.25. In this example, the probability to hit the bonus based on one credit is set to one in 60,000 plays of the basic game. The average number of plays of the basic game to reset the progressive jackpot award (achieving a 100% award) is one in 1,860,000 plays. The reset predetermined minimum amount is $250.00. The increment allocated to the progressive jackpot award from each input wager is set at 4% in this example. This percentage is relatively low in order to account for the partial percentage awards which do not reset the progressive jackpot award amount. The strike price of $994.00 is thus determined as the predetermined minimum amount ($250) added to the average number of plays (at one credit or $0.01) that result in the progressive jackpot being awarded and that amount being multiplied by the increment allocated percentage (1,860,000×0.04×$0.01=$744.00). The percentage awarded represents the value of each award expressed as the different percentages of the progressive jackpot award. In this example, the percentage awards may be 1%, 10%, 20%, 25% and 100% of the progressive jackpot amount. The average value represents the average award received when a percentage award representing a percentage of the progressive jackpot amount is awarded. The average value is based on the portion of the jackpot multiplied by the strike price. The weight is the outcome ranges that will result in the award of each of the percentage awards of the progressive jackpot. In this example, the total weight is 93 outcomes and the different weights for each percentage award are shown in Table 1. The probability is the percentage that each different award of different percentage values of the progressive jackpot amount will be awarded when the bonus feature trigger is achieved. The expected value (not shown) of each percentage award is the average value multiplied by the probability for that percentage award which results in an overall expected value of $159.25 in this example.

TABLE 1

| Percentage of Jackpot Awarded | | | |
|---|---|---|---|
| % Awarded | Weight | Prob | Average |
| 1.00% | 40 | 0.430108 | $9.94 |
| 10.00% | 20 | 0.215054 | $99.40 |
| 20.00% | 10 | 0.107527 | $198.80 |
| 25.00% | 10 | 0.107527 | $248.50 |
| 50.00% | 10 | 0.107527 | $497.00 |
| 100.00% | 3 | 0.032258 | $994.00 |
| Total | 93 | 1 | $159.25 |

The ability to award percentage awards of a progressive jackpot amount without resetting the progressive jackpot amount is attractive and enticing to players who are excited about winning a portion of a progressive jackpot while maintaining the relatively larger current progressive jackpot amount. Further, the growth of the progressive jackpot will be less frequently impeded, resulting in higher displayed progressive jackpot amounts which serve as a further incentive to play the wagering game.

Figure 7:
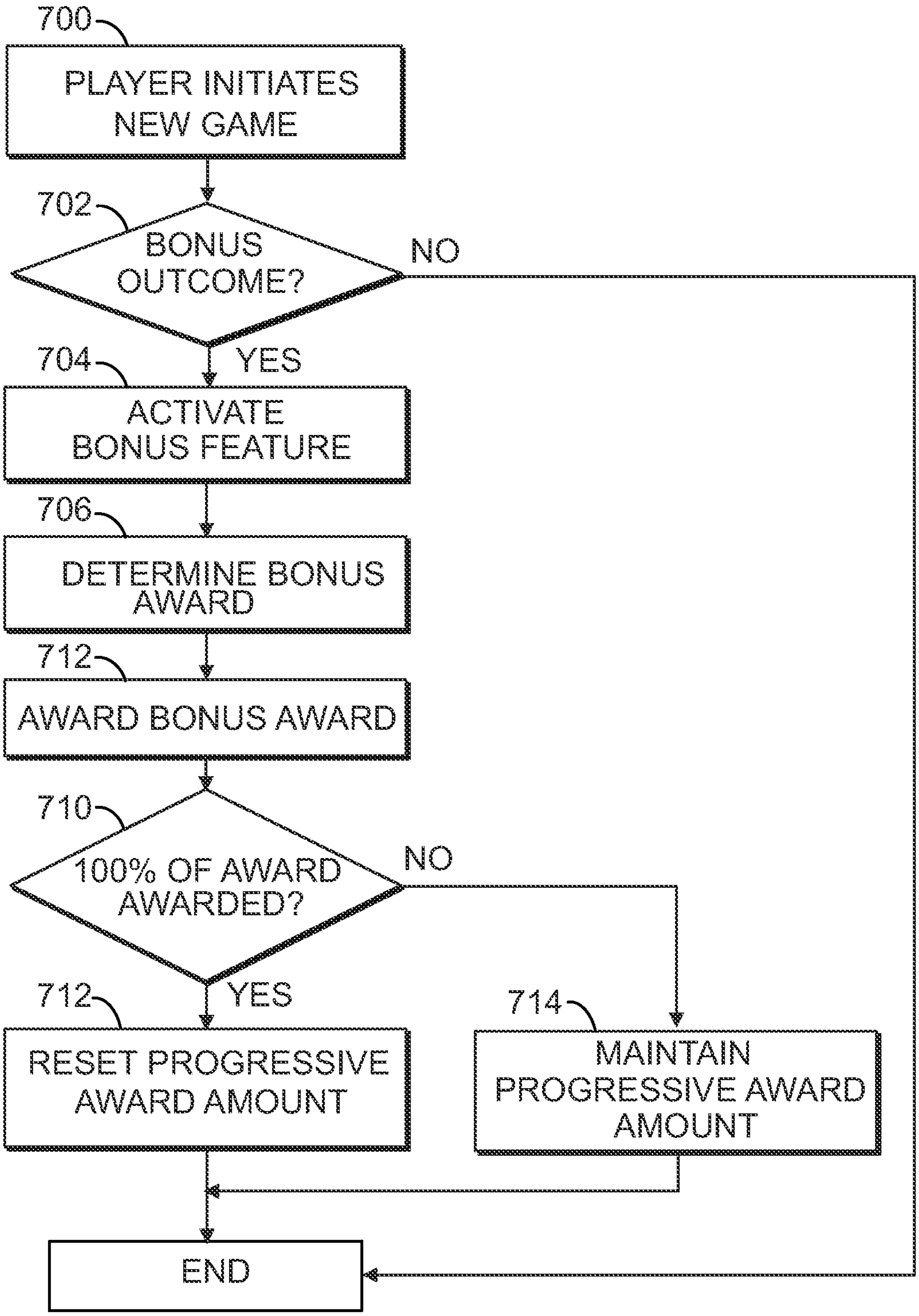
FIG. 7 is a flowchart for an algorithm that corresponds to instructions executed by a controller in accord with at least some aspects of the disclosed concepts.

FIG. 7, described by way of example above, represents one algorithm that corresponds to the at least some instructions executed by the controller 42 and/or external systems 46 in FIG. 2 to perform the above described functions associated with the disclosed concepts. The memory may store these instructions for one or more aspects of the methods and systems as described herein, including the method for a progressive award with partial percentage awards without resetting the progressive award amount, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium that is read from and/or written to by a magnetic, optical, or other reading and/or writing system that is coupled to the processor, may be used for the memory.

A player initiates the play of the basic game shown in FIG. 4 (700). The play is initiated by accepting, at a user interface device such as the player input devices 26 in FIG. 1, a player input and transforming the player input into electronic data signals indicative of a wager to play the wagering game. At least one of the gaming apparatus processors such as the controller 42 in FIG. 2 interprets the wager from the data signals and, at least in part, causes the recording of a digital representation of the wager in at least one of the gaming apparatus storage devices such as the memory 44. A certain percentage of the wager is added to the progressive jackpot award. Of course, percentages from other gaming terminals may contribute to the progressive jackpot award. At least one of the gaming apparatus processors such as the controller 42 initiates the game sequence of the wagering game on the gaming apparatus such as the gaming terminal 10. The user interface device such as the player interface 26 activates the wagering game.

The wagering game sequence includes determining whether a bonus feature outcome has occurred (702). If a bonus feature outcome has occurred, the wagering game activates the informational screen 500 as shown in FIG. 5 on the primary display 14 in FIG. 1 to display the different percentages of the progressive jackpot award a player may be awarded and the bonus feature mechanics as shown in FIG. 6 on the secondary display 16 (704). If a bonus game outcome is not achieved, the algorithm ends. The wagering game then determines the type of bonus feature outcome and the corresponding award which are different percentages of the progressive jackpot award for a payout (706). The wagering game then awards the corresponding award having a percentage value of the progressive jackpot award to the player (708). The wagering game then decides whether the proportion of the award is 100% of the jackpot (710). If a 100% payout is selected, the award is taken from the progressive jackpot award amount and the progressive jackpot award is reset to the predetermined minimum amount (712). If an award having a percentage value less than the entire amount of the progressive jackpot is awarded, the progressive jackpot award remains the same (714) since the percentage awards are paid similar to payouts from the basic game and are not paid from the progressive jackpot award.

Each of these embodiments and obvious variations thereof is contemplated as falling within the spirit and scope of the claimed invention, which is set forth in the following claims.

What is claimed is:

1. A gaming system comprising:

a wager input for receiving a wager from a player to play a wagering game;

at least one display to display a randomly selected outcome of the wagering game; and at least one controller operative to:

provide a progressive jackpot award and a first award that is a predetermined constant percentage of the progressive jackpot award, the predetermined constant percentage being less than 100%;

change the progressive jackpot award, while maintaining the first award at the predetermined constant percentage of the progressive jackpot award by contributing at least a portion of the wager to the progressive jackpot award; and conduct a feature including (i) awarding the first award determined by taking the predetermined constant percentage of the progressive jackpot award without resetting the progressive jackpot award, or (ii) awarding at least the entire progressive jackpot award and resetting the progressive jackpot award to a predetermined minimum value.

2. The gaming system of claim 1, wherein the progressive jackpot award includes a strike price and an expected value of the first award is a function of the strike price.

3. The gaming system of claim 1, wherein the first award is one of a plurality of awards each having a value that is determined by a different constant predetermined percentage of the progressive jackpot award, the different constant percentage less than 100% of the progressive jackpot award, and wherein the feature includes awarding any one of the plurality of awards without resetting the progressive jackpot award.

4. The gaming system of claim 3, wherein the awarding at least the entire progressive jackpot award includes awarding greater than 100% of the progressive jackpot award.

5. The gaming system of claim 1, wherein the feature is triggered independent of any outcome in the wagering game.

6. A method of conducting a wagering game on a gaming system, comprising:

accepting, at a user interface device, a player input indicative of a wager to play the wagering game;

providing a progressive jackpot award and a first award that is a predetermined constant percentage of the progressive jackpot award, the predetermined constant percentage being less than 100%;

changing the progressive jackpot award, while maintaining the first award at the predetermined constant percentage of the progressive jackpot award by contributing at least a portion of the wager to the progressive jackpot award;

displaying a randomly generated outcome of the wagering game on a display device; and in response to a triggering event, using at least one gaming apparatus controller to conduct a bonus feature including (i) awarding the first award determined by taking the predetermined constant percentage of the progressive jackpot award, and keeping the progressive jackpot award at the same level or (ii) awarding a second award that is at least the entire progressive jackpot award and resetting the progressive jackpot award to a predetermined minimum value.

7. The method of claim 6, wherein the progressive jackpot award includes a strike price and an expected value of the first award is a function of the strike price.

8. The method of claim 6, wherein the bonus feature includes awarding any of a plurality of awards and keeping the progressive jackpot award at the same level, the plurality of awards including the first award and each of the plurality of awards having a value that is determined by a taking a different constant predetermined percentage of the progressive jackpot award, the different constant percentages each less than 100% of the progressive jackpot award.

9. The method of claim 8, wherein the second award is greater than 100% of the progressive jackpot award.

10. The method of claim 6, wherein the bonus feature is triggered independent of any outcome in the wagering game.

11. A method of conducting a wagering game on a gaming system, comprising:

accepting a player input at a user interface device indicative of a wager to play the wagering game;

providing a progressive jackpot award and a plurality of awards that are each a predetermined constant percentage of the progessive jackpot award, the predetermined constant percentage being less than 100%;

changing the progressive jackpot award, while maintaining the plurality of awards at the predetermined constant percentages of the progressive jackpot award by contributing at least a portion of the wager to the progressive jackpot award; and using at least one controller to conduct a feature including (i) awarding one of the plurality of awards without resetting the progressive jackpot award, each of the plurality of awards being determined by taking the predetermined constant percentage of the progressive jackpot award, or (ii) awarding at least the entire progressive jackpot award and resetting the progressive jackpot award to a predetermined minimum value.

12. The method of claim 11, wherein the progressive jackpot award includes a strike price and the expected value of the plurality of awards is a function of the strike price.

13. The method of claim 11, wherein the feature is triggered independent of any outcome in the wagering game.

14. A non-transitory machine readable medium having stored thereon instructions for award different percentage amounts of a progressive award jackpot, comprising machine executable code which when executed by at least one machine, causes the machine to:

receive a wager from a player to play a wagering game;

display a randomly selected outcome of the wagering game;

provide a progressive jackpot award and a first award that is a predetermined constant percentage of the progressive jackpot award, the predetermined constant percentage being less than 100%;

change the progressive jackpot award, while maintaining the first award at the predetermined constant percentage of the progressive jackpot award by contributing at least a portion of the wager to the progressive jackpot award; and conduct a feature including (i) awarding the first award without resetting the progressive jackpot award, the first award determined by taking the predetermined constant percentage of the progressive jackpot award, or (ii) awarding at least the entire progressive jackpot award and resetting the progressive jackpot award to a predetermined minimum value.

15. A progressive gaming method, comprising:

displaying a progressive jackpot award on a display device;

displaying a first award that is a predetermined constant percentage of the progressive jackpot award, the predetermined constant percentage being less than 100%;

using at least one controller to increment the progressive jackpot award in response to play of wagering games at one or more gaming devices while maintaining the first award at the predetermined constant percentage of the progressive jackpot award; and in response to a triggering event, using at least one controller to (i) award the first award determined by taking the predetermined constant percentage of the progressive jackpot award without resetting the progressive jackpot award to a reset value, or (ii) award at least the entire progressive jackpot award and resetting the progressive jackpot award to the reset value.

16. The method of claim 15, wherein the triggering event is independent of any outcome in the wagering game.

* * * * *

UNITED STATES PATENT AND TRADEMARK OFFICE

CERTIFICATE OF CORRECTION

PATENT NO. : 8,506,391 B2
APPLICATION NO. : 12/905580
DATED : August 13, 2013
INVENTOR(S) : Jaffe et al.

It is certified that error appears in the above-identified patent and that said Letters Patent is hereby corrected as shown below:

In the Claims

In column 13, line 16 (claim 11, line 7), please delete “progessive” and insert -- progressive --, therefor.

Signed and Sealed this
Thirty-first Day of December, 2013

Margaret A. Focarino

Margaret A. Focarino
*Commissioner for Patents of the United States Patent and Trademark Office*